United States Patent [19]

Jackson et al.

[11] 4,037,410

[45] July 26, 1977

[54] HYDRAULIC CONTROL VALVE

[75] Inventors: Alan D. Jackson, Hutchinson; Homer R. Graber, Pretty Prairie; Robert D. Krehbiel, Hutchinson, all of Kans.

[73] Assignee: The Cessna Aircraft Company, Wichita, Kans.

[21] Appl. No.: 690,342

[22] Filed: May 26, 1976

[51] Int. Cl.$^2$ .............................................. F16H 39/46

[52] U.S. Cl. ........................................ 60/445; 60/450; 60/452; 137/625.68

[58] Field of Search ................. 60/445, 450, 451, 452, 60/484; 137/596.12, 596.13, 625.68; 417/218

[56] References Cited

U.S. PATENT DOCUMENTS

| | | | |
|---|---|---|---|
| 3,401,521 | 9/1968 | Plate | 60/452 X |
| 3,486,334 | 12/1969 | Miller | 60/450 |
| 3,508,847 | 4/1970 | Martin | 60/445 X |
| 3,754,400 | 8/1973 | Parquet | 60/445 |
| 3,777,492 | 12/1973 | Boydell et al. | 60/445 X |

*Primary Examiner*—Edgar W. Geoghegan

*Attorney, Agent, or Firm*—Edward L. Brown, Jr.

[57] ABSTRACT

A hydraulic control valve in a closed-center load responsive system having a passage with a check valve therein downstream of the inlet metering and signal passage allowing flow from the signal passage to the load prior to connecting the pressure circuit to the load circuit so as to relieve fluid from the signal circuit to the load circuit as the signal circuit attains a pressure higher than the existing load thus causing flow past the inlet metering whereby the pressure differential in the metering compensates the pump.

16 Claims, 4 Drawing Figures

HYDRAULIC CONTROL VALVE

DESCRIPTION OF THE PRIOR ART

In pressure-flow compensated systems which utilize variable displacement pumps, it is permissible for the pump to maintain only the prearranged flow or pressure level rather than dumping its maximum flow and pressure across a relief valve. A further advancement of this type of system, generally referred to as a load responsive system, permits the variable displacement pump to maintain only that flow and pressure level necessary to move a particular load. This type system is typified in U.S. Pat. No. 3,401,521 which senses the load by opening the signal passage so that the load pressure is exerted on the pump compensator bringing the pump discharge level up to a level slightly exceeding the load just prior to opening the load to the pump discharge.

In a craning function, which is a situation wherein a crane or backhoe is holding a heavy load and it is desirous to slowly lift the load, it is desirable and quite often critical to prevent any back flow which would allow the load to momentarily drop before it begins to raise.

The above mentioned patent has this sagging problem in that immediately prior to raising a load, the load pressure is opened to the sensing passage allowing back flow to drain through sensing line to reservoir before the pump can balance the load circuit pressure and provide the flow necessary to lift the load. This momentary back flow through sensing line allows the load to drop that small amount of fluid which is displaced through the sensing line before the pump discharge is open to the motor thereby raising the load.

In the situation where a crane is holding large sections of structural steel or pipe which must be accurately positioned, it is quite crucial that the control valve and related system not allow the load to drift downward even a small amount prior to lifting.

SUMMARY OF THE INVENTION

The present invention solves this downward drift problem wherein the load is positively held from any back flow through the sensing circuit to the reservoir before the pump discharge is open to the load. This is achieved by opening the pump discharge to the signal passage with the signal passage connected to the load through a craning passage across a check valve preventing any flow from the load to the signal passage. With the valve spool of the present system in its intermediate position, the pump discharge is open across inlet metering to the signal passage causing the pressure in the signal passage to raise. The flow increases with spool movement until the pressure in the signal passage matches that of the load wherein any additional flow from the pump discharge into the signal passage would flow to the load across the craning passage. As the flow across the inlet metering creates a sufficient pressure differential, the flow compensator of the pump controls the pump maintaining a pressure slightly in excess of the load. A variation of this invention is an intermediate position which opens the pump discharge directly to the signal passage causing the pump to go to its maximum pressure level prior to opening the pump to the load. This variation of the invention is less efficient in that maximum system pressure is usually not required to lift the load.

The principal object of the present invention is to provide a control valve in a load responsive system which will positively hold a load without any back flow through the circuit prior to lifting.

Another object of the present invention is to provide a load responsive valve in a pressure flow compensated system which has a simplified signal circuit.

Other objects and advantages of the present invention will become more apparent to those skilled in the art from the following detailed description which proceeds with references to the accompanying drawings wherein.

Figure 1:
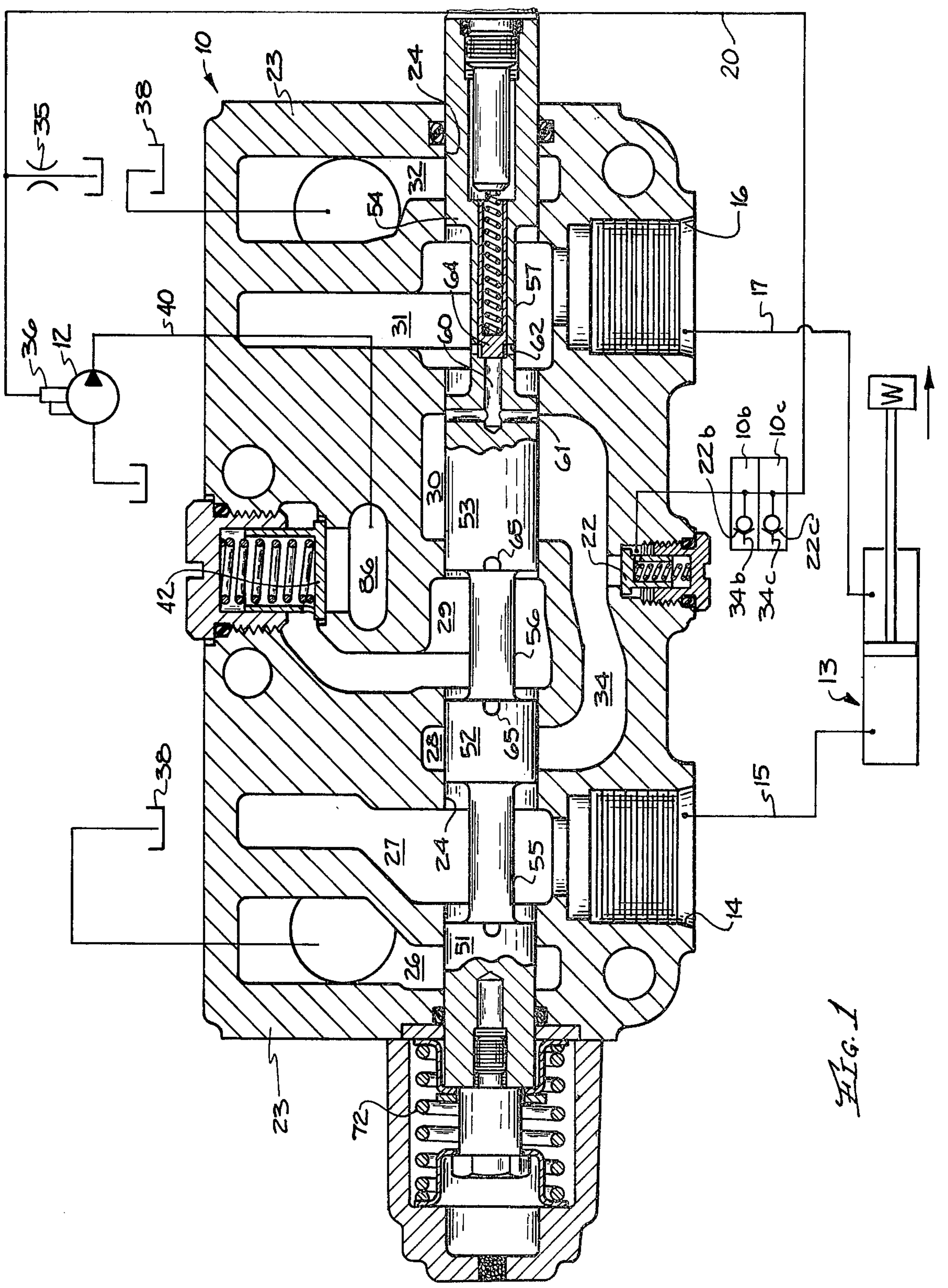
FIG. 1 is a longitudinal cross sectional view of the directional control valve of the present invention with its associated circuit schematically shown.

With reference to FIG. 1 of the drawing, the directional control valve of the present invention is generally described by reference numeral 10. Control valve 10 is a stack-type valve, well known in the trade, wherein a plurality of sections are sandwiched together in a stack with each valve using common pump pressure passages and drain passages. Adjacent similar sections 10b and 10c are symbolically shown. Control valve 10 controls the flow of fluid from a pressure flow compensated variable displacement piston pump 12 to a double acting motor or cylinder 13 which in turn lifts a load W. Pressure flow compensated pump 12 is well known in the art and is shown in detail in U.S. Pat. No. 3,508,847. Control valve 10 includes a pair of work ports 14 and 16 connected to motor 13 via lines 15 and 17 respectively. Control valve 10 also controls the flow compensator 36 on pump 12 through signal line 20 which is symbolically shown immediately downstream from check valve 22. Control valve 10 has a longitudinal bore 24 through the valve body 23. Intersecting bore 24 is a pair of return cavities 26 and 32 which are connected to reservoir 38, as symbolically shown, along with the other valve sections, not shown, which can be utilized in the stack. Positioned just adjacent the return cavities and intersecting the valve bore are a pair of motor port cavities 27 and 31 which are in turn connected to work ports 14 and 16. Centrally positioned in the valve body 23 and intersecting bore 24 is pump pressure cavity 29 which is in turn supplied by a blind-ended passage 86. Passage 86 is in turn connected to the pump discharge line 40, as symbolically shown. The pump discharge flow from passage 86 flows into pressure cavity 29 across a conventional check valve 42, generally known in the art as a load check. Intersecting bore 24 is a branch signal cavity 34 having two legs 28 and 30 positioned on opposite sides of pump cavity 29. Connected to signal cavity 34 is signal line 20 across check valve 22. Connected in parallel to line 20 are similar signal cavities **34*b* and 34*c* from adjacent valve sections 10*b* and 10*c*. Located in valve bore 24 is valve spool 50 having a centering mechanism 72 at the left end thereof which normally maintains the valve spool in its neutral position, as seen in FIG. 1. Valve spool 50 includes lands 51, 52, 53 and 54 separated by grooves 55, 56 and 57. Located in the center of spool 50 is a craning passage 60 intersected by two lateral passages 61 and 62. Positioned in craning passage 60 is a check valve 64 which prevents flow from motor port cavity 31 into signal cavity 34. Located in the edges of valve spool lands 52 and 53 are metering notches 65 which meter flow from the pump pressure cavity 29 into the signal cavity 34.**

OPERATION

In the neutral position, as illustrated in FIG. 1, the signal cavity 34 is cut-off from pump pressure cavity 29 as well as the work port cavities 27 and 31, causing the pressure in signal line 20 to drop to zero due to the presence of restricted drain passage 35. With the pressure in the signal line 20 at atmospheric; the flow compensating means 36, symbolically shown, will cause the pump to stroke back to a low pressure standby condition. The details of a low pressure standby system are shown in U.S. Pat. No. 3,486,334. All flow compensating means require a restriction in the flow path with sensing lines connected upstream and downstream of the restriction to measure the pressure differential thereacross. The measuring restriction in the present valve is valve spool land 52 and 53 and its corresponding metering notch 65. In other words, the pressure in pump cavity 29 is compared with the pressure downstream of the spool in cavity 34 via check valve 22 and signal line 20. The pressure drop across the valve spool in turn controls the flow compensating means 36 which in turn controls the discharge flow and pressure of the pump 12.

As previously mentioned, in the FIG. 1 neutral position the pump 12 is in a low pressure standby condition, since signal line 20 is at atmospheric pressure.

Figure 2:
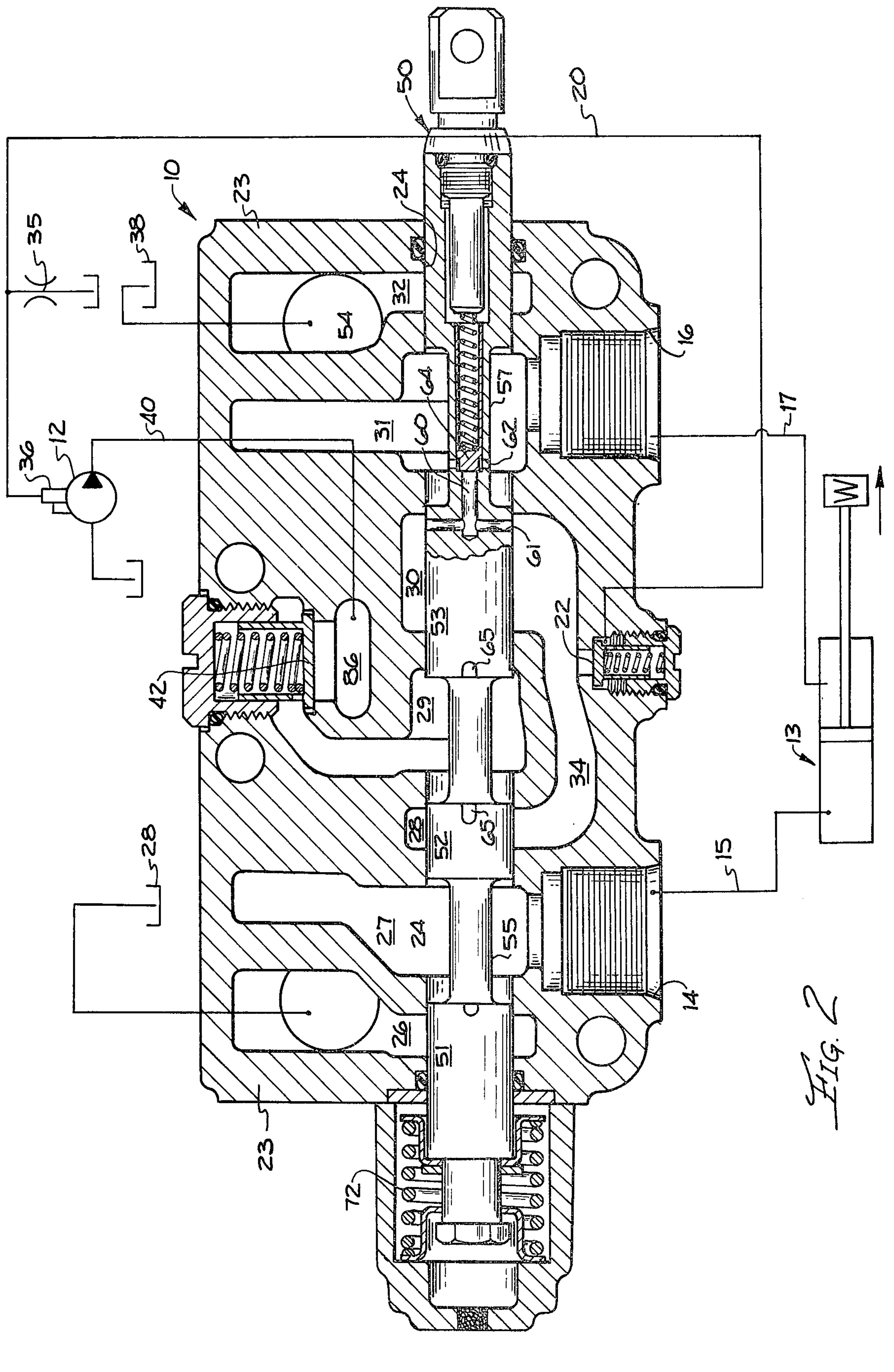
FIG. 2 illustrates a similar longitudinal cross section with the valve spool in its intermediate position.

When valve spool 50 is moved to the left to its intermediate FIG. 2 position, fluid is metered across notch 65 and land 52 into signal cavity 34. At very low flow rates across notch 65, pressure will not build in signal cavity 34 since the restriction 35 to drain will be capable of venting this small flow. As the flow increases across notch 65, as seen in FIG. 2, pressure will begin to build in signal cavity 34 and corresponding signal line 20. This in turn causes the flow compensator 36 to sense this pressure differential and increase the stroke of pump 12. This direct connection between the pump discharge and the sensing line 20 causes the pump pressure to increase towards its maximum pressure level. However, when the pressure in sensing cavity 34 exceeds the load pressure experienced in cavity 31, craning check valve 64 will open allowing flow from signal cavity 34 into motor port cavity 31. By reason of this flow across craning passage 60, a pressure differential is created across the spool metering notch 65, satisfying the flow compensator 36. Therefore pump 12 is prevented from going to its maximum pressure level, unless the load experienced in motor port cavity 31 is actually at the maximum pressure level. Since the pressure in signal cavity 34 is approximately the same as the load, the pressure in the pump cavity 29 will be greater by a preset amount, as set by the compensator 36, for example, 200 PSI.

When the valve spool 50 is moved further to the left from its FIG. 2 position, groove 62 opens a passage allowing flow from passage 34 into motor port cavity 31. Since the pressure in cavity 29 is 200 PSI, higher than the load, and the flow area in notch 65 is now sufficient to saturate orifice 35, there is no back flow from the load and the load immediately begins to raise without any downward drift.

FIGURE 3 MODIFICATION

Figure 3:
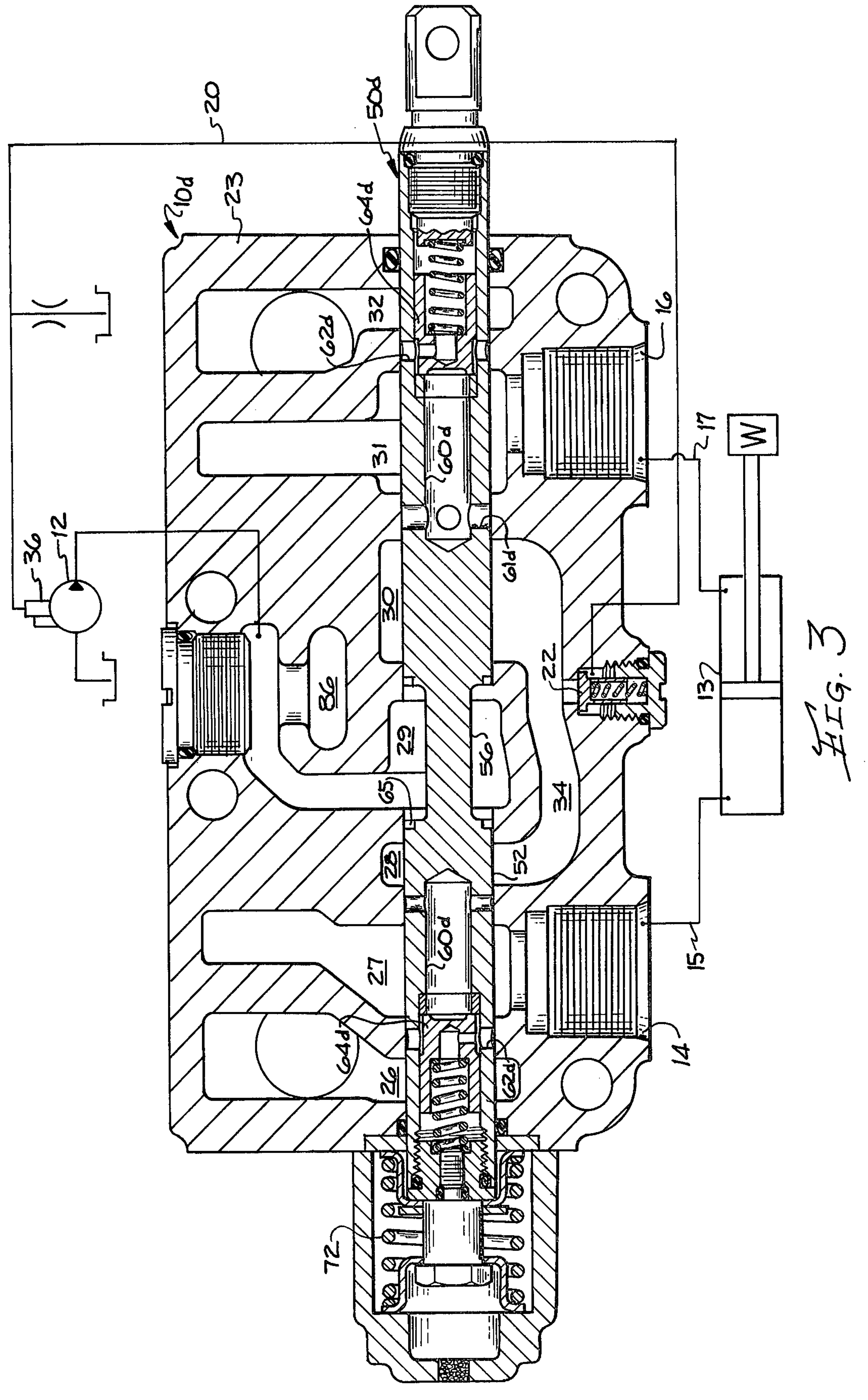
FIG. 3 is a longitudinal section of a directional control valve with a modified form of craning check valves.

FIG. 3 is a modified form of the invention wherein the craning check valves **64*d* are of a full flow type rather than the limited flow check valves shown in FIGS. 1 and 2.**

When valve spool **50*d* is moved to its intermediate position, spool notch 65 meters flow from pump cavity 29 into signal cavity 34. When the pressure in signal cavity 34 exceeds that in motor port cavity 31, craning check 64*d* opens and pressure in the signal cavity 34 flows through passages 61*d*, 60*d* and 62*d* into motor port cavity 31. As valve spool 50*d* is moved further to the left its full position, fluid is still metered across land 52 into signal cavity 34 with this entire flow passing across check valve 64*d*. Valve spool 50*d* includes a similar craning lift check 64*d* and associated passage in the left end of the spool to accommodate motor port 14 in a like manner. With use of a full flow craning check 64*d*, valve 10*d* of FIG. 3 does not require a conventional load check between the pump cavities 29 and 86.**

FIGURE 4 MODIFICATION

Figure 4:
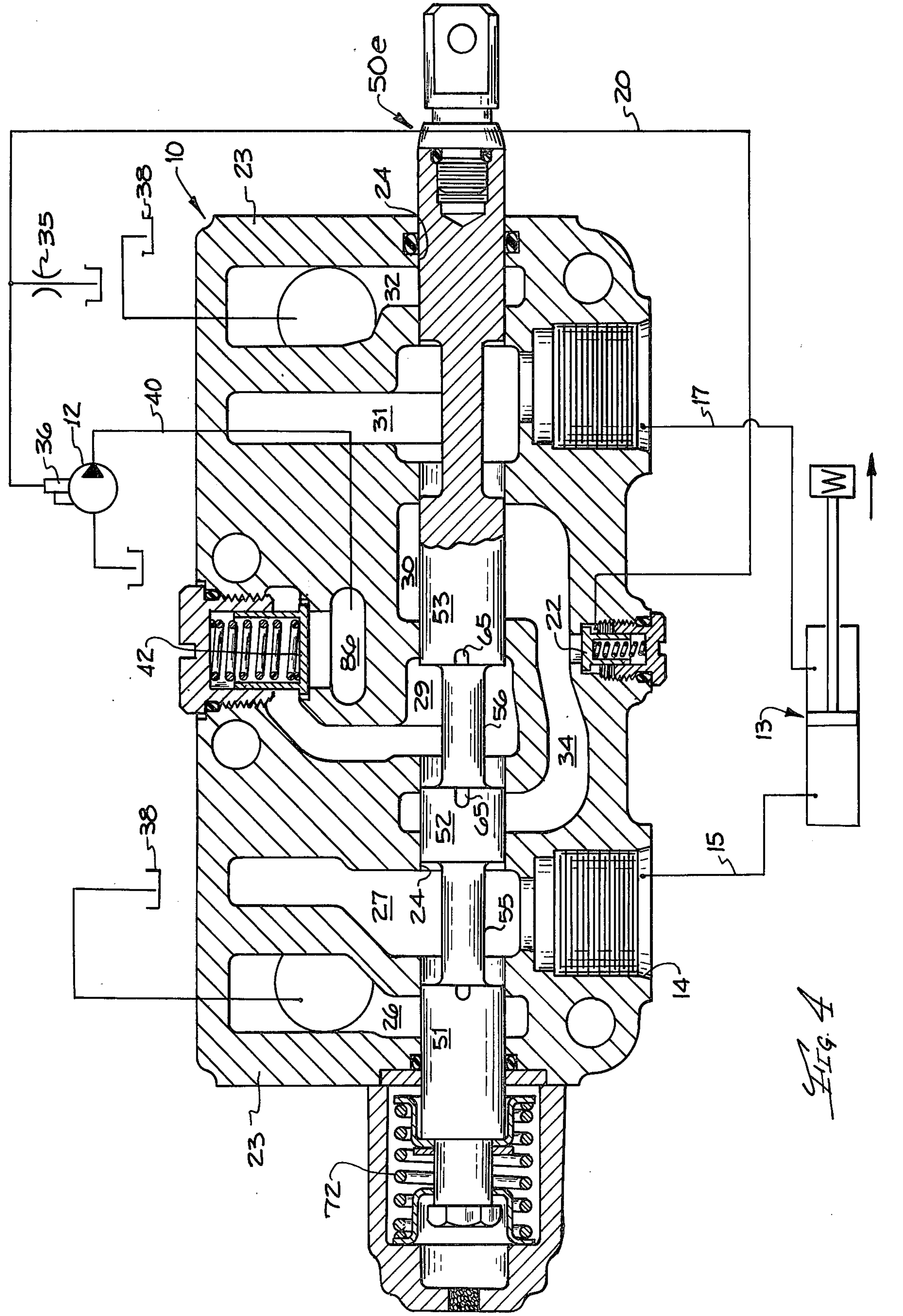
FIG. 4 is a longitudinal section of a directional control valve showing a modified form of the invention.

FIG. 4 is a modified form of the invention in which the valve body 23 is identical to that shown the previous figures. Valve spool **50*e* is different from that shown in FIG. 1** in that it has no craning passage and associated check valve.

When valve spool **50*e* is moved to the left, to its intermediate position, notch 65 begins to meter fluid from pump cavity 29 into signal cavity 34. In this intermediate position, the pump discharge is directly connected to the pump compensator through signal line 20 and signal cavity 34 thereby causing the pump to go to its maximum pressure compensating level. When the valve spool 50*e* is then moved further to the left, to its operative position, signal cavity 34** is pressurized at its maximum level thereby preventing any drift in the load prior to raising the load.

Having described the invention with sufficient clarity to enable those familiar with the art to construct and use it, we claim:

1. A hydraulic valve in a closed-center load responsive system supplied by a pressure flow compensated variable displacement pump having a flow compensating means:

a valve body;

a bore in the body;

a pump pressure cavity intersecting the bore and connected to the pump discharge;

a motor port cavity intersecting the bore adjacent the pump pressure cavity;

a signal passage intersecting the valve bore intermediate the pump pressure cavity and the motor port cavity, the signal passage connecting with the flow compensating means of said pump;

a craning passage including a check valve therein connecting the motor port cavity to the signal passage allowing flow only from the signal passage to the motor port cavity;

a valve spool means positioned in said bore having a first neutral position blocking flow from the pump pressure cavity and flow from the motor port cavity;

a second position metering flow from the pump pressure cavity across the signal passage into the motor port cavity and an intermediate third position metering flow from the pump pressure cavity into the signal passage, whereby the flow compensating means of the pump maintains a pressure level at a preset level abpve the load pressure in the motor port cavity.

2. A hydraulic valve as set forth in claim 1, including a restricted drain passage in the signal passage whereby pressure in the signal passage goes to atmosphere when flow to the signal passage is blocked.

3. A hydraulic valve as set forth in claim 1, wherein the craning passage is positioned in the valve spool and the check valve has a limited flow.

4. A hydraulic valve as wet forth in claim 1, wherein the craning passage is positioned in the valve spool.

5. A hydraulic valve as set forth in claim 1, wherein the signal passage includes a separate cavity intersecting the bore intermediate the pump pressure cavity and the motor port cavity.

6. A hydraulic valve as set forth in claim 1, wherein the craning passage is positioned in the valve spool and the check valve has a limited flow; the craning passage being so positioned as to be open when the valve spool means is in its intermediate third position.

7. A hydraulic valve as set forth in claim 1, including a restricted drain passage in the signal passage, the craning passage being located in the valve spool permitting limited flow from the signal passage to the motor port cavity in the intermediate position; load check valve means in the pump pressure cavity preventing any back flow to the pump.

8. A hydraulic valve as set forth in claim 1, wherein the craning passage is positioned in the valve spool so that it is open during said three positions of the valve; all of the flow to the motor port cavity is through the craning passage.

9. A hydraulic valve as set forth in claim 1, including a restricted drain passage in the signal passage; a second motor port cavity intersecting the bore on the opposite side of the pump pressure cavity from the first motor port cavity, the signal passage comprising a branch cavity intersecting the valve bore with two legs, each leg being on opposite sides of the pump pressure cavity and between the pump pressure cavity and the first or second motor port cavities.

10. A hydraulic valve as set forth in claim 1, including a restricted drain passage in the signal passage; a second motor port cavity intersecting the bore on the opposite side of the pump pressure cavity from the first motor port cavity, the signal passage comprising a branch cavity intersecting the valve bore with two legs, each leg being opposite sides of the pump pressure cavity and between the pump pressure cavity and the first or second motor port cavities, wherein the craning passage is positioned in the valve spool and the check valve has a limited flow.

11. A hydraulic valve as set forth in claim 1, including a restricted drain passage in the signal passage; a second motor port cavity intersecting the bore on the opposite side of the pump pressure cavity from the first motor port cavity, the signal passage comprising a branch cavity intersecting the valve bore with two legs, each leg being on opposite sides of the pump pressure cavity and between the pmp pressure cavity and the first or second motor port cavities, wherein the craning passage is positioned in the valve spool and the check valve has a limited flow; the craning passage being so positioned as to be open when the valve spool means is in its intermediate third position.

12. A hydraulic valve as set forth in claim 1 including an additional valve means acting in conjunction with said valve spool means, said additional means connecting the signal passage to drain when the valve spool means is in its first neutral position.

13. A hydraulic valve in a closed-center load responsive system supplied by a pressure flow compensated variable displacement pump having a flow compensating means:

a valve body;

a bore in the body;

a pump pressure cavity intersecting the bore and connected to the pump discharge;

a motor port cavity intersecting the bore adjacent the pump pressure cavity;

a signal passage intersecting the valve bore intermediate the pump pressure cavity and the motor port cavity, the signal passage connecting with the flow compensating means of said pump a valve spool means positioned in said bore having a first neutral position blocking flow from the pump pressure cavity and flow from the motor port cavity;

a second position metering flow from the pump pressure cavity across the signal passage into the motor port cavity and an intermediate third position metering flow from the pump pressure cavity into the signal passage while blocking flow to or from the motor port cavity; whereby the flow compensating means of the pump goes to maximum pressure level in the intermediate third position.

14. A hydraulic valve as set forth in claim 13, including a restricted drain passage in the signal passage whereby pressure in the signal passage goes to atmosphere when flow to the signal passage is blocked.

15. A hydraulic valve as set forth in claim 13, wherein the signal passage includes a separate cavity intersecting the bore intermediate the pump pressure cavity and the motor port cavity.

16. A hydraulic valve as set forth in claim 13, including a restricted drain passage in the signal passage; a second motor port cavity intersecting the bore on the opposite side of the pump pressure cavity from the first motor port cavity, the signal passage comprising a branch cavity intersecting the valve bore with two legs, each leg being on opposite sides of the pump pressure cavity and between the pump pressure cavity and the first or second motor port cavities.

* * * * *